(12) United States Patent
Barone et al.

(10) Patent No.: US 11,204,094 B2
(45) Date of Patent: Dec. 21, 2021

(54) METHOD TO CONTROL A ROAD VEHICLE PROVIDED WITH A SERVO-ASSISTED TRANSMISSION DURING A SLOWING-DOWN PHASE

(71) Applicant: FERRARI S.p.A., Modena (IT)

(72) Inventors: Alessandro Barone, Bologna (IT);
Andrea Nannini, Modena (IT);
Giacomo Senserini, Modena (IT);
Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/015,359

(22) Filed: Sep. 9, 2020

(65) Prior Publication Data

US 2021/0095759 A1  Apr. 1, 2021

(30) Foreign Application Priority Data

Sep. 30, 2019 (IT) .......................... 102019000017510

(51) Int. Cl.
*F16H 61/02* (2006.01)
*F16H 59/38* (2006.01)
(Continued)

(52) U.S. Cl.
CPC ......... *F16H 61/0213* (2013.01); *F16H 59/38* (2013.01); *F16H 59/44* (2013.01);
(Continued)

(58) Field of Classification Search
CPC .......... F16H 59/38; F16H 59/44; F16H 59/48; F16H 59/54; F16H 59/70; F16H 61/0213;
(Continued)

(56) References Cited

U.S. PATENT DOCUMENTS

| 7,014,592 B2 * | 3/2006 | Wiethe .................... F16H 61/21 477/120 |
| 2012/0196722 A1 | 8/2012 | Preisner et al. |

(Continued)

FOREIGN PATENT DOCUMENTS

| DE | 102005035885 A1 | 2/2007 |
| WO | 2015024792 A2 | 2/2015 |

OTHER PUBLICATIONS

Search Report issued in Italian Patent Application No. 201900017510, completed Apr. 1, 2020; 8 pages.

*Primary Examiner* — Edwin A Young
(74) *Attorney, Agent, or Firm* — Cantor Colburn LLP

(57) ABSTRACT

A method to control a road vehicle provided with a servo-assisted transmission during a slowing down phase; the control method generally includes, when the servo-assisted transmission is in an automatic operating mode, the steps of: calculating, assuming that a pressing of the brake pedal remains constant, an opening time interval needed to allow the road vehicle to reach an opening speed at which a clutch of the servo-assisted transmission is definitively opened; calculating a number of downshifts that can be carried out in the opening time interval based on a time needed to carry out a downshift; scheduling the downshifts to be carried out in order to get from the current gear engaged in the servo-assisted transmission to an opening gear with which the clutch of the servo-assisted transmission is definitively opened, so as to carry out no more than the number of downshifts that can be carried out in the opening time interval; and carrying out the scheduled downshifts.

9 Claims, 2 Drawing Sheets

(51) Int. Cl.
  *F16H 59/44* (2006.01)
  *F16H 59/48* (2006.01)
  *F16H 59/54* (2006.01)
  *F16H 59/70* (2006.01)

(52) U.S. Cl.
  CPC .............. *F16H 59/48* (2013.01); *F16H 59/54* (2013.01); *F16H 59/70* (2013.01)

(58) Field of Classification Search
  CPC .. F16H 61/04; F16H 61/08; F16H 2061/0218; F16H 2061/0223; F16H 2061/0444; F16H 2061/0448; F16H 2302/02; F16H 2306/20; F16H 2312/18
  See application file for complete search history.

(56) References Cited

U.S. PATENT DOCUMENTS

2017/0268664 A1* 9/2017 Kim .................... F16H 61/0213
2018/0017156 A1* 1/2018 Kato ................. F16H 61/66272
2020/0132188 A1* 4/2020 Fujiwara ................ F16H 61/08

* cited by examiner

METHOD TO CONTROL A ROAD VEHICLE PROVIDED WITH A SERVO-ASSISTED TRANSMISSION DURING A SLOWING-DOWN PHASE

CROSS-REFERENCE TO RELATED APPLICATIONS

This patent application claims priority from Italian patent application no. 102019000017510 filed on Sep. 30, 2019, the entire disclosure of which is incorporated herein by reference.

TECHNICAL FIELD

The invention related to a method to control a road vehicle provided with a servo-assisted transmission during a slowing-down phase.

The invention finds advantageous application in a drivetrain provided with a dual-clutch, servo-assisted transmission, to which explicit reference will be made in the description below without because of this loosing in generality.

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

When the drivetrain operates in an automatic mode, namely when the gear shifts are not requested by the driver, but are autonomously decided by the control unit of the drivetrain (simulating the behaviour of an automatic transmission), and when the road vehicle 1 proceeds at a moderate speed (namely, the road vehicle 1 is driven in a non-high-performance mode), "high" gears are generally used in order to allow the internal combustion engine to operate at low speeds (for example, ranging from approximately 1,500 to 2,500 revolutions/minute) so as to minimize fuel consumptions. In these conditions, the control unit of the drivetrain uses a lower threshold and an upper threshold: when the rotation speed of the internal combustion engine is lower than the lower threshold, a downshift is carried out (namely, a new, lower gear is engaged), whereas, when the rotation speed of the internal combustion engine exceeds the upper threshold, an upshift is carried out (namely, a new, higher gear is engaged); this control mode is effective in allowing the internal combustion engine to operate at low speeds, but risks causing too low speeds (namely, it can cause the internal combustion engine to run too slowly, with consequent operation irregularities which could even lead to an undesired turning off) when the driver decides to stop the road vehicle by acting upon the brake pedal (more or less strongly), since a downshift requires a given time of execution in order to ensure the necessary comfort (which is indispensable when the drivetrain operates in an automatic mode) and there could not be the time needed to carry out all requested downshifts in order to prevent the rotation speed from getting too much below the lower threshold.

The solution currently used to prevent the internal combustion engine from running too slowly is that of speeding up the downshifts (namely, forcing particularly quick downshifts); however, this solution (due to the quickly executed downshifts) leads to impulsive longitudinal accelerations and causes sudden increases in the speed of the internal combustion engine, thus significantly reducing the driving comfort perceived by the driver.

Patent application WO2015024792A1 describes a method to control a road vehicle provided with a servo-assisted transmission during a slowing-down phase; when the conditions allow for it, a multiple downshift is carried out, which prevents intermediate gears between an initial gear and a final gear from being engaged.

DESCRIPTION OF THE INVENTION

The object of the invention is to provide a method to control a road vehicle provided with a servo-assisted transmission during a slowing-down phase, said method not suffering from the drawbacks discussed above and, at the same time, being easy and economic to be implemented.

According to the invention there is provided a method to control a road vehicle provided with a servo-assisted transmission during a slowing-down phase, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
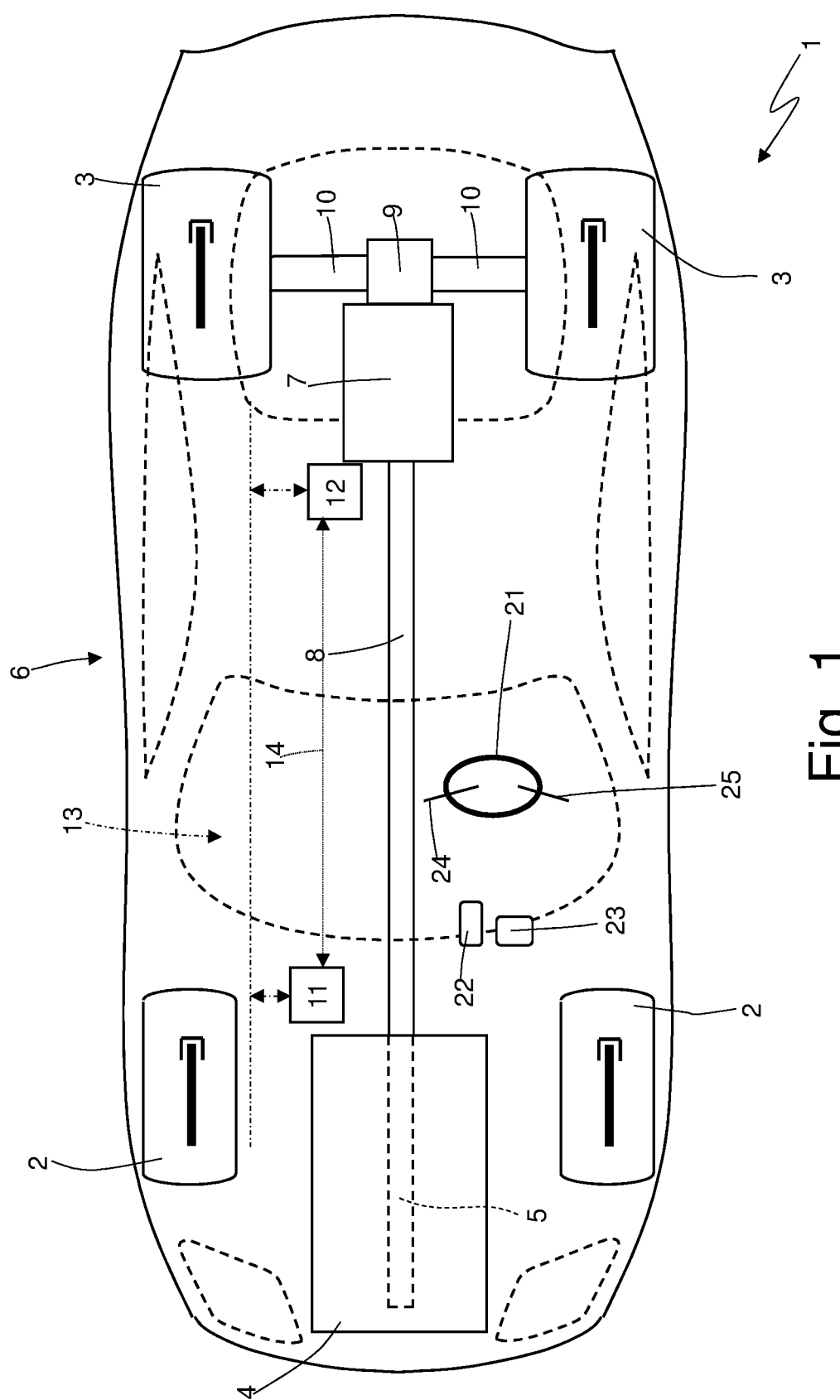
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the engine 4, which controls the engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the engine 4 and the control unit 12 of the drivetrain 6 are connected to the BUS line 13 and, therefore, can communicate with one another by means of messages sent through the BUS line 13. Furthermore, the control unit 11 of the engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the engine 4 without the delays caused by the BUS line 13. Alternatively, the synchronization cable 14 could be absent and all communications between the two control units 11 and 12 could be exchanged using the BUS line 13.

Figure 2:
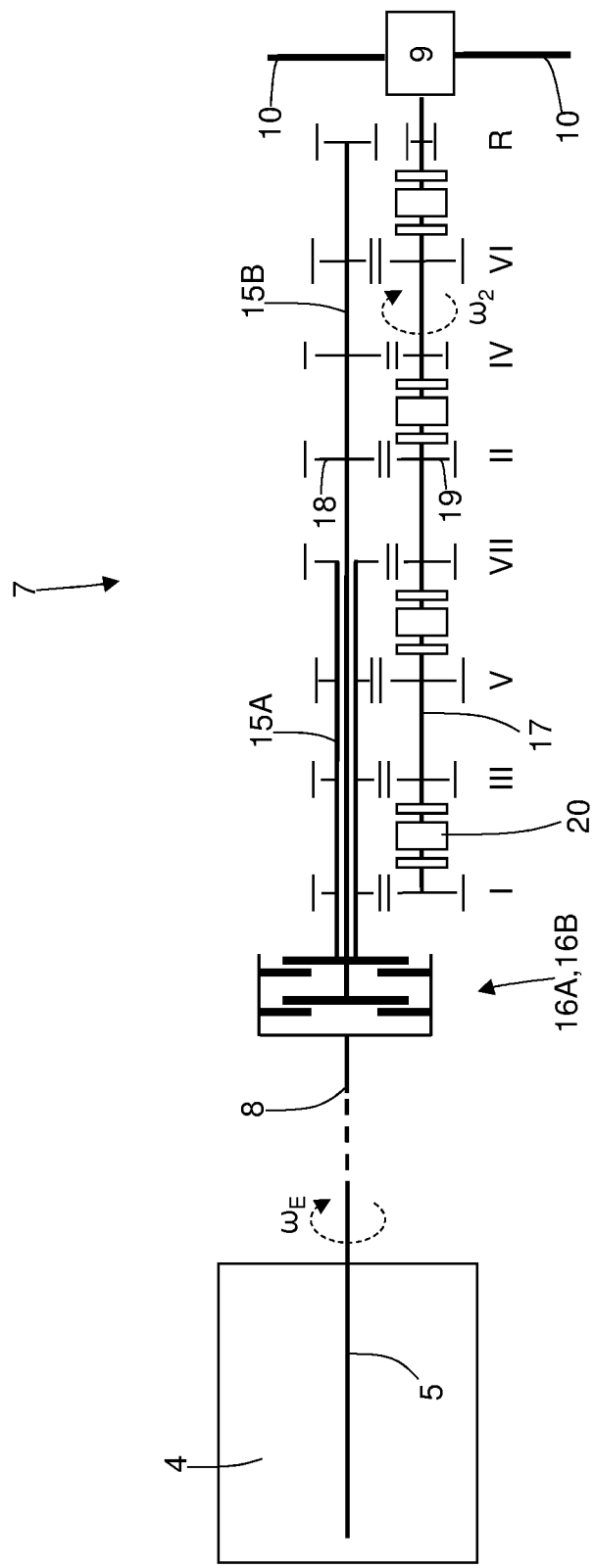
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

The drivetrain 6 can operate in an automatic mode, namely the gear shifts are not requested by the driver, but are autonomously decided by the control unit 12 of the drivetrain 6 (simulating the behaviour of an automatic transmission).

In use, when the drivetrain 6 operates in automatic mode and during a slowing-down phase, the control unit 12 of the drivetrain 6 detects a current speed of the road vehicle 1, detects a rotation speed $\omega_E$ of an internal combustion engine 4, detects a current gear engaged in the servo-assisted transmission 7 and detects a pressing of the brake pedal 23 (for example, by detecting the pressure of the brake fluid in the hydraulic circuit of the braking system). At this point, the control unit 12 of the drivetrain 6 calculates, assuming that the pressing of the brake pedal 23 remains constant, an opening time interval needed to allow the road vehicle 1 to reach an opening speed at which the clutch 16 of the servo-assisted transmission 7 is definitively opened (in view of the upcoming stopping of the road vehicle 1); furthermore, the control unit 12 of the drivetrain 6 calculates a number of downshifts that can be carried out in the opening time internal based on an amount of time needed to carry out a downshift (and taking into account the fact that, when the drivetrain operates in an automatic mode, the downshifts have to be executed with an utmost comfort and, therefore, require a given execution time, for example in the range of 800-900 milliseconds).

Subsequently, the control unit 12 of the drivetrain 6 schedules the downshifts to be carried out in order get from the current gear engaged in the servo-assisted transmission 7 to an opening gear (generally, the second gear II), with which the clutch 16 of the servo-assisted transmission 7 is definitively opened, so as to carry out no more (if necessary, less) than the number of downshifts that can be carried out in the opening time interval; finally, during the opening time interval, the control unit 12 of the drivetrain 6 carries out the previously scheduled downshifts so that, at the end of the opening time interval, in the servo-assisted transmission 7 there is engaged the opening gear (generally, the second gear II) and, hence, the clutch 16 is definitively opened.

According to a preferred embodiment, the opening gear is the second gear II, the road vehicle 1 is stopped with the clutch 16 open and, after the road vehicle 1 has been stopped, the first gear I is engaged in the servo-assisted transmission 7.

Generally speaking, the control unit 12 of the drivetrain 6 always tries and schedule single downshifts (namely, the following gear is consecutive to the previous gear); however, if the number of downshifts that can be carried out in the opening time interval is smaller than the number of gears existing between the current gear engaged in the servo-assisted transmission 7 and the opening gear, the scheduling of the downshifts necessarily involves at least one multiple downshift (namely, the following gear is not consecutive to the previous gear, for example in case of a downshift from the seventh gear VII to the fourth gear IV or in case of a downshift from the sixth gear VI to the third gear III). The control unit 12 of the drivetrain 6 preferably arranges for a multiple downshift at the beginning of the schedule (namely, first in the schedule) of the downshifts (namely, it immediately carries out a possible multiple downshift), so that the last downshifts of the schedule of downshifts are single downshifts.

According to a preferred embodiment, the control unit 12 of the drivetrain 6 cyclically detects the pressing of the brake pedal 23, recalculates (in case of change in the pressing of the brake pedal 23) the opening time interval, recalculates (in case of change in the pressing of the brake pedal 23) the number of downshifts that can be carried out in the opening time interval and, then, reschedules (in case of change in the pressing of the brake pedal 23) the downshifts to be carried out in order to get from the current gear engaged in the servo-assisted transmission 7 to the opening gear.

The control unit 12 of the drivetrain 6 schedules the downshifts preventing the rotation speed $\omega_E$ of the internal combustion engine 4 from falling below a predetermined lower threshold, so as to make sure that the internal combustion engine 4 does not run too slowly; namely, the control unit 12 of the drivetrain 6 schedules the downshifts so as to always allow the rotation speed $\omega_E$ of the internal combustion engine 4 to exceed the predetermined lower threshold.

According to a preferred embodiment, the control unit 12 of the drivetrain 6 measures (by means of a suitable sensor) a rotation speed $\omega_2$ of the secondary shaft 17 of the servo-assisted transmission 7 and calculates a longitudinal deceleration of the road vehicle 1 by calculating the time derivative of the rotation speed $\omega_2$ of the secondary shaft 17 of the servo-assisted transmission 7. Then, the control unit 12 of the drivetrain 6 calculates the opening time interval based on the longitudinal deceleration of the road vehicle 1; namely, the control unit 12 of the drivetrain 6 calculates, based on the longitudinal deceleration of the road vehicle 1, how much time the road vehicle 1 needs to reach the opening speed (at which the clutch 16 of the servo-assisted transmission 7 is definitively opened).

What disclosed above can be applied, with no significant changes, even when the drivetrain 6 of the road vehicle 1 is provided with a single-clutch, servo-assisted transmission.

The control method described above has different advantages.

First of all, the control method described above, when the drivetrain 6 operates in an automatic mode, allows the road vehicle 1 to be stopped without causing the internal combustion engine 4 to run too slowly and, especially, without affecting the driving comfort perceived by the driver.

Furthermore, the control method described above is easy and economic to be implemented as its execution requires a limited memory space and a reduced calculation ability.

LIST OF THE REFERENCE NUMBERS OF THE FIGURES

1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter
25 downshift paddle shifter
$\omega_E$ rotation speed
$\omega_2$ rotation speed

The invention claimed is:

1. A method to control a road vehicle (1) provided with a servo-assisted transmission (7) during a slowing down phase; the control method comprises, when the servo-assisted transmission (7) is in an automatic operating mode, the steps of:
    detecting a current speed of the road vehicle (1);
    detecting a current gear engaged in the servo-assisted transmission (7);
    detecting a pressing of a brake pedal (23);
    calculating, assuming that the pressing of the brake pedal (23) remains constant, an opening time interval needed to allow the road vehicle (1) to reach an opening speed at which a clutch (16) of the servo-assisted transmission (7) is definitively opened;
    calculating a number of downshifts that can be carried out in the opening time interval based on a time needed to carry out a downshift;
    scheduling the downshifts to be carried out in order to get from the current gear engaged in the servo-assisted transmission (7) to an opening gear with which the clutch (16) of the servo-assisted transmission (7) is definitively opened, so as to carry out no more than the number of downshifts that can be carried out in the opening time interval; and
    carrying out the scheduled downshifts.

2. The control method according to claim 1, wherein, if the number of downshifts that can be carried out in the opening time interval is smaller than the number of gears existing between the current gear engaged in the servo-assisted transmission (7) and the opening gear, the scheduling of the downshifts involves at least one multiple downshift.

3. The control method according to claim 2, wherein a multiple downshift is always arranged first in the scheduling of the downshifts.

4. The control method according to claim 2, wherein at least the last downshift of the scheduling of the downshifts is always a single downshift.

5. The control method according to claim 1 and comprising the further steps of:
cyclically detecting a pressing of the brake pedal (23);
recalculating, in case of a change in the pressing of the brake pedal (23), the opening time interval;
recalculating, in case of a change in the pressing of the brake pedal (23), the number of downshifts that can be carried out in the opening time interval; and
rescheduling, in case of a change in the pressing of the brake pedal (23), the downshifts to be carried out in order to get from the current gear engaged in the servo-assisted transmission (7) to the opening gear.

6. The control method according to claim 1, wherein:
the opening gear is a second gear (II);
the road vehicle (1) is stopped with the clutch (16) open; and
after the vehicle (1) has been stopped, a first gear (I) is engaged in the servo-assisted transmission (7).

7. The control method according to claim 1, wherein the scheduling of the downshifts is carried out preventing a rotation speed ($\omega_E$) of an internal combustion engine (4) from falling below a predetermined lower threshold.

8. The control method according to claim 1 and comprising the further steps of:
determining a longitudinal deceleration of the road vehicle (1); and
calculating the opening time interval based on the longitudinal deceleration of the road vehicle (1).

9. The control method according to claim 8 and comprising the further steps of:
measuring a rotation speed ($\omega_2$) of a secondary shaft (17) of the servo-assisted transmission (7); and
calculating the longitudinal deceleration of the road vehicle (1) by calculating the time derivative of the rotation speed ($\omega_2$) of the secondary shaft (17) of the servo-assisted transmission (7).

* * * * *